:::

United States Patent
Qayyum et al.

(10) Patent No.: US 9,002,803 B2
(45) Date of Patent: Apr. 7, 2015

(54) ROLE-BASED SECURITY POLICY FOR AN OBJECT-ORIENTED DATABASE SYSTEM

(75) Inventors: Kashif Qayyum, San Leandro, CA (US); Seamus Donohue, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 226 days.

(21) Appl. No.: 13/154,714

(22) Filed: Jun. 7, 2011

(65) Prior Publication Data

US 2012/0317129 A1    Dec. 13, 2012

(51) Int. Cl.
     *G06F 7/00*      (2006.01)
     *G06F 17/30*      (2006.01)
     *G06F 21/62*      (2013.01)

(52) U.S. Cl.
     CPC .... *G06F 17/30525* (2013.01); *G06F 17/30604* (2013.01); *G06F 21/6227* (2013.01); *G06F 2221/2141* (2013.01)

(58) Field of Classification Search
     USPC .................................. 707/705, 758, 781, 687
     See application file for complete search history.

(56) References Cited

U.S. PATENT DOCUMENTS

| | | | | |
|---|---|---|---|---|
| 6,003,040 | A * | 12/1999 | Mital et al. | 717/165 |
| 6,389,433 | B1 * | 5/2002 | Bolosky et al. | 707/749 |
| 7,437,362 | B1 * | 10/2008 | Ben-Natan | 1/1 |
| 7,779,265 | B2 * | 8/2010 | Dubhashi et al. | 713/182 |
| 8,103,677 | B1 * | 1/2012 | Ruggiero et al. | 707/748 |
| 2002/0019810 | A1 * | 2/2002 | Kumar et al. | 705/42 |
| 2004/0143608 | A1 * | 7/2004 | Nakano et al. | 707/204 |
| 2006/0236381 | A1 * | 10/2006 | Weeden | 726/6 |
| 2006/0251338 | A1 * | 11/2006 | Gokturk et al. | 382/305 |
| 2009/0106207 | A1 * | 4/2009 | Solheim et al. | 707/3 |
| 2010/0110935 | A1 * | 5/2010 | Tamassia et al. | 370/256 |

\* cited by examiner

*Primary Examiner* — Hosain Alam
*Assistant Examiner* — Eliyah S Harper
(74) *Attorney, Agent, or Firm* — Van Pelt, Yi & James LLP

(57) ABSTRACT

A system for adding security data to a search index comprises a processor and a memory. The processor is configured to select an object in a search index, wherein an entry associated with the object is stored in the search index and add security entity data to an entry of the search index corresponding to the selected object. A memory is coupled to the processor and is configured to provide the processor with instructions.

13 Claims, 12 Drawing Sheets

Browsing Employees -> All

Location
- Walnut Creek (22)
- Belfast (187)
- Cambridge (8)

Division
- Design (30)
- Fabrication (156)
- Marketing (29)
- Accounting (2)

Manager
- Sally Jackson (18)
- Katalin Moran (15)
- John Vest (29)
- Jim Donnelley (155)

Salary Grade
- $50k - $75k (110)
- $75k - $100k (4)
- $100k - $150k (2)
- $150k - $250k (1)

Baldwin, Tom
Bartowski, Chuck
Bristow, Sydney
Carter, Adam
Carter, Fiona
Clark, John
Cooper, Dale
Cotton, Jerry
Doggett, John
Donnelley, Jim
Dunham, Olivia
Earle, Windom
Esterhase, Toby
Fyers, Eddie
Follmer, Brad
Ford, Wyman
Fury, Nick
Garcia, Penelope
Giardello, Mike
Gideon, Jason
Goldstein, Jeremy
Graham, Will
Granger, Colby
Greenaway, Elle
Guillam, Peter
Harris, Dwight
Hogan, Bob
Hollis, Emma
• • •

Fig. 7A

Browsing Employees -> Cambridge 722 /720

| | |
|---|---|
| Location<br>✓ Cambridge (8) — 724 | Bartowski, Chuck<br>Clark, John<br>Ford, Wyman<br>Hollis, Emma<br>Skouris, Diana<br>Vest, John<br>Westen, Michael<br>Wisdom, Pete |
| Division<br>✓ Design (6) — 726<br>Fabrication (1)<br>Marketing (1) | |
| Manager<br>✓ Sally Jackson (1) — 728<br>John Vest (7) | |
| Salary Grade<br>✓ $75k - $100k (2) — 730 | |

ROLE-BASED SECURITY POLICY FOR AN OBJECT-ORIENTED DATABASE SYSTEM

BACKGROUND OF THE INVENTION

A database software system is commonly used to produce various kinds of reports describing the data store in the database. In a human resources database system, for instance, reports are produced listing employees having a certain set of attributes. One desirable feature of database report generation software is not only to be able to filter by a particular attribute (e.g., show me all of the employees who work at the San Leandro site) but also to produce on-the-fly counts of database entries sorted by each attribute of various fields (e.g., show me the number of employees at each site; show me the number of employees with each manager, etc.). Some database systems can receive a command directed at one of the attributes (e.g., a mouse click on the San Leandro site) and display in response a list of entries filtered by that attribute and an updated set of counts of database entries sorted by each attribute of various fields within the list of entries filtered by the selected attribute (e.g., show me the number of employees with each manager at the San Leandro site). Producing a user interface that operates in such a manner requires very rapid access to the data set. Additionally, in a database system, it may be desirable to implement a security policy such that some users do not have access to all attributes of all database entries (e.g., a manager can see the salaries of his subordinates but not of his peers or his superiors).

BRIEF DESCRIPTION OF THE DRAWINGS

Various embodiments of the invention are disclosed in the following detailed description and the accompanying drawings.

FIG. 7A is a diagram illustrating an embodiment of a faceted database browsing interface implementing a role-based security policy for an object-oriented database system.

FIG. 7B is a diagram illustrating an embodiment of a faceted database browsing interface implementing a role-based security policy for an object-oriented database system.

DETAILED DESCRIPTION

Figure 1:
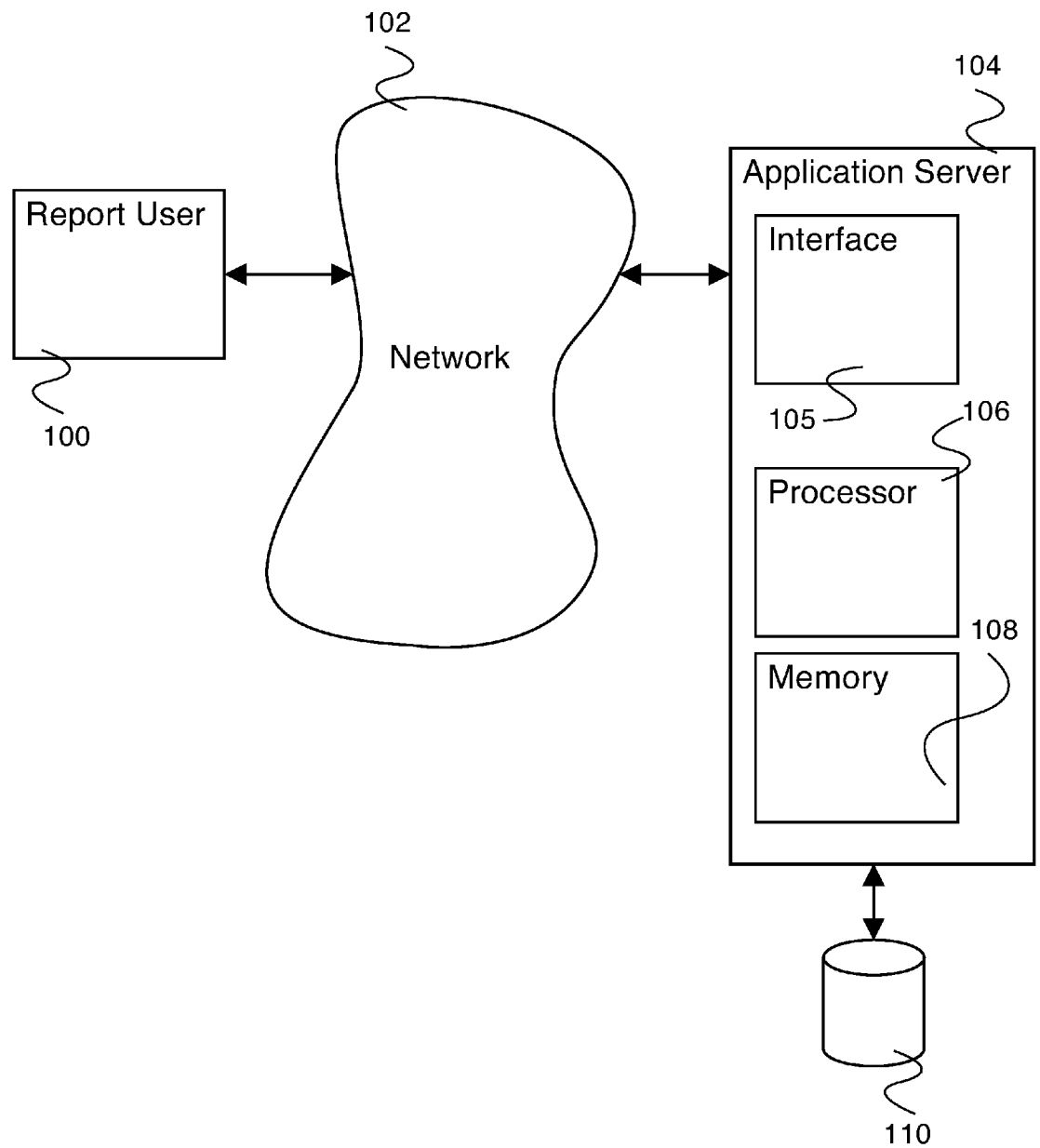
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for adding security data to a search index comprises a processor and a memory. The processor is configured to select an object in a search index. An entry associated with the object is stored in the search index. The processor is further configured to add security entity data to an entry of the search index corresponding to the selected object. The memory is coupled to the processor. The memory is configured to provide the processor with instructions.

A system for querying a search index comprises a processor and a memory. The processor is configured to search a search index for objects to generate a list of objects with a matching field value to a field value to a query. The processor is configured to filter the list of objects to include only those objects that a user is allowed to access using a security entity data for the user. The memory is coupled to the processor. The memory is configured to provide the processor with instructions.

A role-based security policy for an object-oriented database is disclosed. In order to provide rapid access to a security policy in an object-oriented database, a relation is created for each entity in the database to an object describing its security policy. The object is referred to as the "security entity," and exists in the object-oriented database like any other object. When a database index is created, containing each database entry and its corresponding attributes and relations, the security entry relation is included. When a user queries the database, the security entities he has access to are determined before executing the query. While the query is being executed, enforcing the security policy compares the security entities the user has access to to the security entity of each database entry as it is searched.

Some database entries have different security policies for different attributes (e.g., the list of employees for whom a user can see their salary is different from the list of employees for whom that same user can see their manager). This can be implemented by creating different security policies for different attributes and relations of the database entry. Each security policy is described by a different security entity relation. As many security entities as are necessary can be assigned to a given database entry.

Security entities comprise a set of security permissions. For example, a security entity data comprises a permissible operation (e.g., read, write, edit, delete, access, view, modify, etc.). Security entities are objects in the object-oriented database and can have relations to other objects. These relations are used to form a hierarchical ordering of the security entities in order to mirror the hierarchical structure of security policy that typically exists in real life. Security entities inherit the access of the security entities below them and gain new access of their own. For instance, a manager can see everything his subordinates can see and then some, so the hierarchy of the security policy follows the hierarchy of the organization. When a user queries the database, a query is run on each security entity he explicitly has access to, expanding the list to include all of the subordinate security entities he implicitly has access to through the hierarchy.

Several database tools have been designed using this security policy. A faceted browsing database search tool produces on-the-fly counts of database entries sorted by each attribute of various fields and allows a user to narrow the search by whichever attribute he desires, updating the database entry counts as he goes. Using the security policy, a user may be able to see that another user exists but not see some of his attribute values. A matrix report creator displays counts of database entries broken down by a first attribute on a first axis and a second attribute on a second axis. In some embodiments, this security policy is used in an object-oriented database for financial data. Financial data creates new database entries for every transaction, building a database much larger than would be typical for human resources data. A security policy for a database of financial information must therefore be fast and scalable.

FIG. 1 is a block diagram illustrating an embodiment of a network system. In the example shown, application server 104 includes interface 105, processor 106 and memory 108. Application server 104 is coupled to external storage 110 so that application server 104 is able to store information to and access information from external storage 110. Application server 104 is also coupled to network 102 using interface 105. In various embodiments, network 102 comprises one or more of the following: a local area network, a wide area network, a wired network, a wireless network, the Internet, or any other appropriate network. Report user 100 accesses application server 104 using network 102. In some embodiments, report user 100 accesses an application running on application server 104. The application processes reports based on stored data. In various embodiments, stored data is related to a business requirement such as a personnel file, data related to an employee, an expense report, or any other relevant data. In some embodiments, stored data is stored in an object-based database. In various embodiments, the application comprises an enterprise application, a human resources application, a business process application, a finance application, a content management application, or any other appropriate application. Application server 104 implements a role-based security policy for an object-oriented database system.

In various embodiments, application server 104 comprises one or more physical servers with one or more processors, one or more memories, and one or more other storage devices (e.g., hard drives, array of drives, etc.) and/or one or more virtual environments (e.g., virtualization of operating system or application processes) in which an application is executed.

Figure 2:
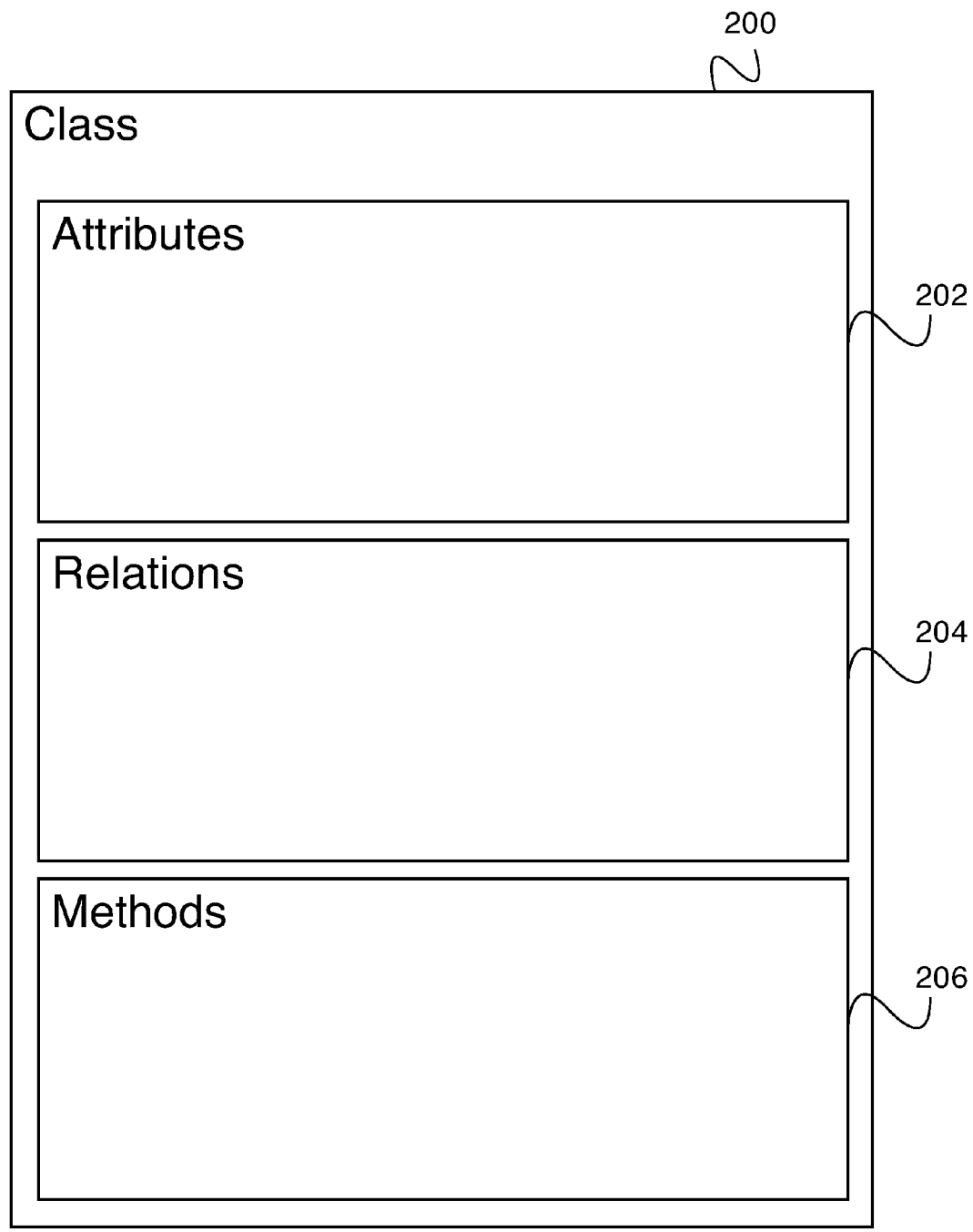
FIG. 2 is a block diagram illustrating an embodiment of a class data structure.

FIG. 2 is a block diagram illustrating an embodiment of a class data structure. In some embodiments, stored data (e.g., data stored in external storage 110 of FIG. 1) is stored in class data structures of FIG. 2. In the example shown, class 200 is comprised of zero, one, or more than one attributes 202, zero, one, or more than one relations 204, and zero, one, or more than one methods 206. Attributes 202 store data about the class, for instance, name, location, salary, title, cost, vendor, or any other human resource, corporate, financial, legal, or medical data, or any other appropriate data. Relations 204 store relations between a given object instance of class 200 and other object instances of the class or of other class definitions. Methods 206 define operations that can be performed with the attributes and relations. A given class definition has a certain set of attributes and relations, as well as a certain set of methods used to operate on those attributes and relations. A given object instance of a class definition comprises a set of stored values for the attributes and relations.

In some embodiments, object classes can inherit from one another. When a child object class inherits from a parent object class, it takes on the class definition of the parent object. The class definition of the child object can then be extended by adding or overwriting methods, attributes, or relations.

In some embodiments, object classes are defined as part of software sold by a system vendor and used by a system user (e.g., report user 100 of FIG. 1). In some embodiments, a system user can create new classes as desired in order to customize and/or extend the software sold by the system vendor.

Figure 3:
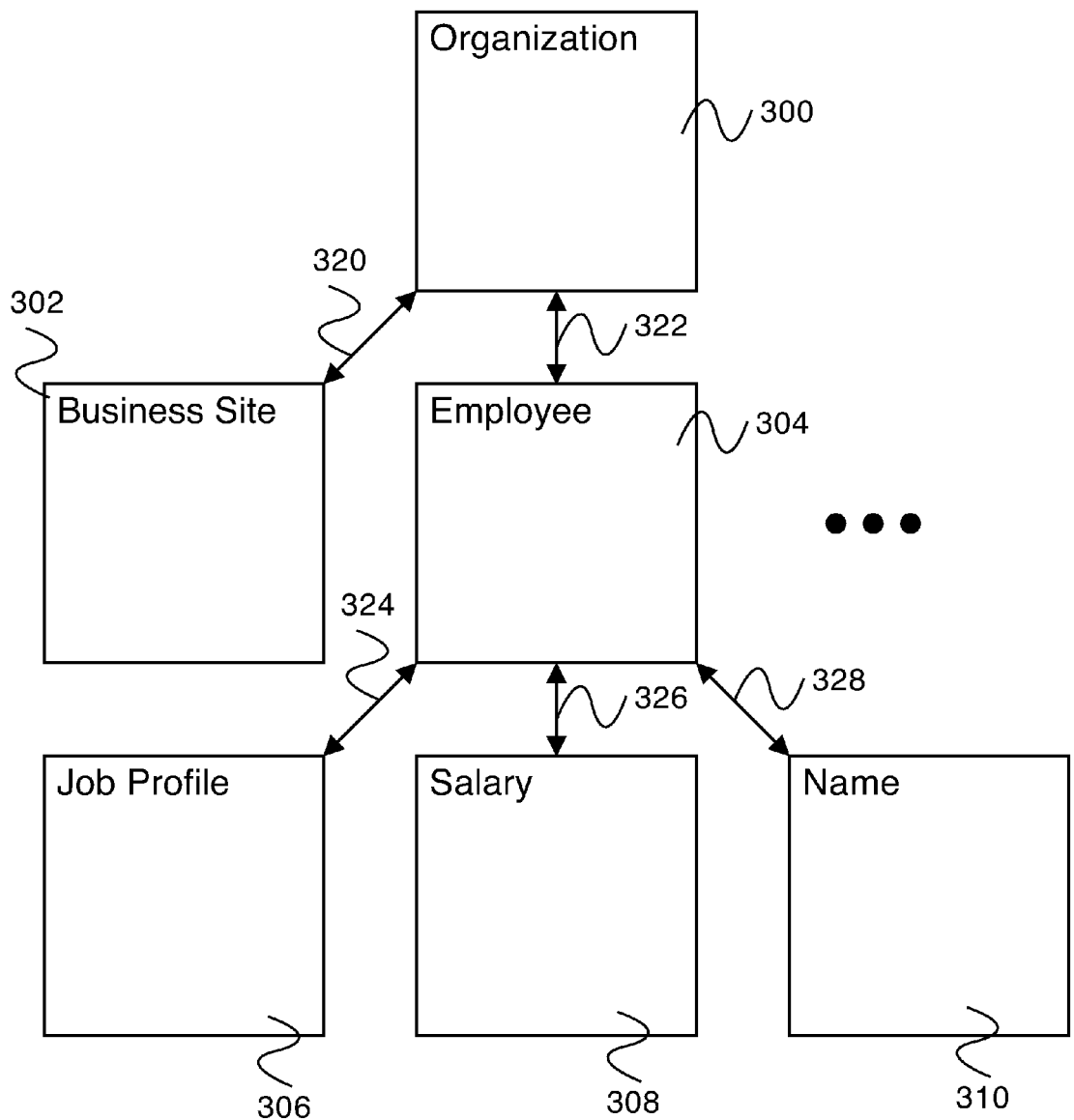
FIG. 3 is a block diagram illustrating an embodiment of a data structure for an object tree.

FIG. 3 is a block diagram illustrating an embodiment of a data structure for an object tree. In some embodiments, the object tree of FIG. 3 may comprise stored data in an application server (e.g., application server 104 of FIG. 1). In some embodiments, objects 300, 302, 304, 306, 308, and 310 comprise object instances of class data structures as shown in FIG. 2. In some embodiments, relations 320, 322, 324, 326, and 328 comprise relations (e.g., relations 204 of FIG. 2). In the example shown, the object instances of FIG. 3 describe part of a business data structure. Organization 300 has relation 320 to business site object instance 302. Business site object instance 302 contains the name of the site at which the organization resides. Organization 300 also has relation 322 to employee object instances including employee object instance 304, each representing an employee that is part of the organization. Employee object instance 304 has relation 324, relation 326, and relation 328 to job profile object instance 306, salary object instance 308, and name object instance 310, respectively. Job profile object instance 306 includes job profile attributes corresponding to employee 304. Salary object instance 308 includes salary attributes corresponding to employee 304. Name object instance 310 includes name attributes corresponding to employee 304. In this way, data can be stored in a way representing the organizational structure of the company. In some embodiments, programs can access and store attribute data by traversing the object tree along the connections between object instances given by relationships, and operate on the stored attribute data to create a meaningful report about the organization.

In some embodiments, when a system user (e.g., report user 100 of FIG. 1) executes an application to access stored object data and create a report, the application implements a role-based security policy for an object-oriented database system. In some embodiments, the role-based security policy comprises allowing the system user access to only a fraction of the stored object data based on the security policy information associated with the system user and the stored object data.

Figure 4:
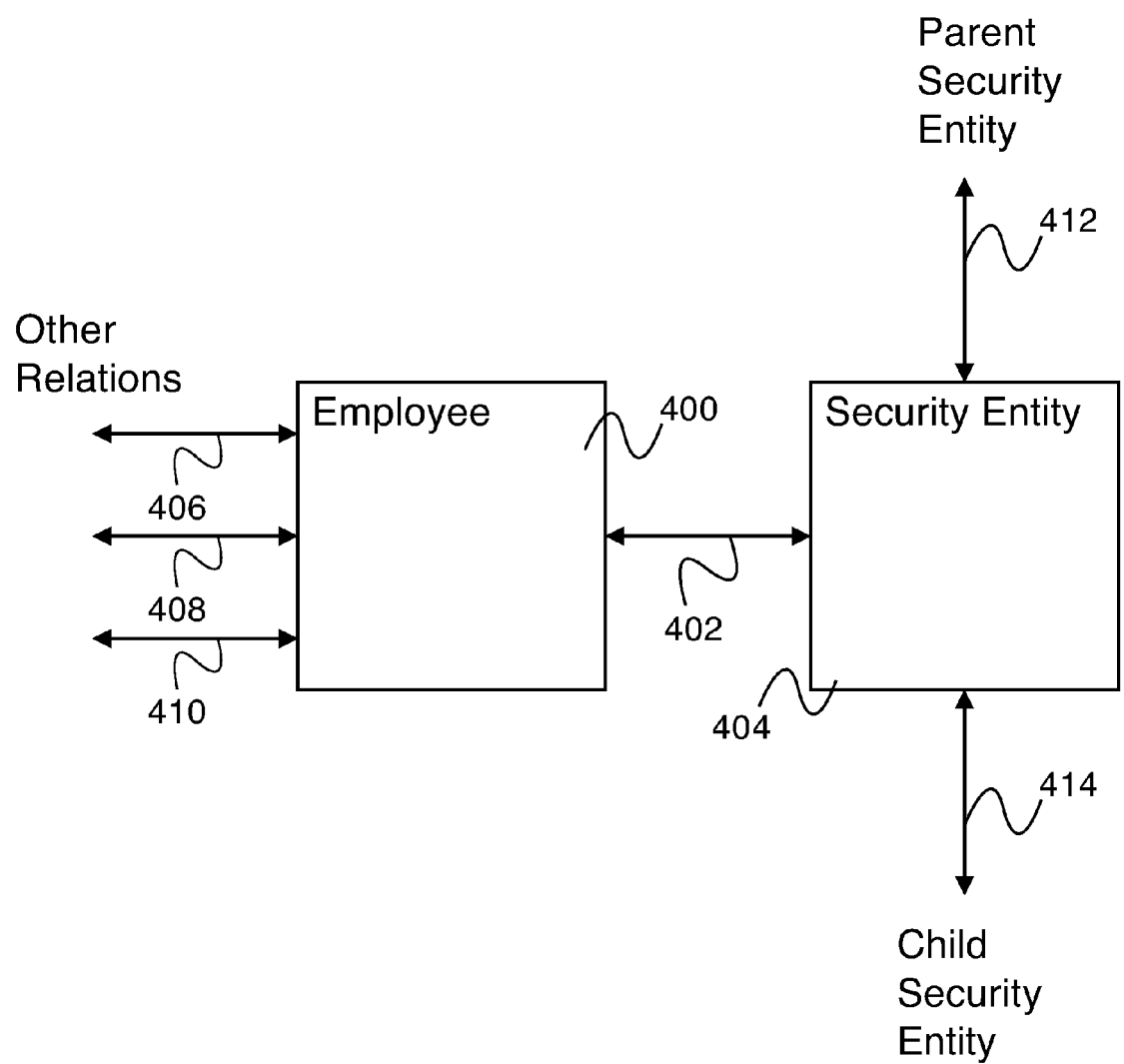
FIG. 4 is a block diagram illustrating an embodiment of a security entity object.

FIG. 4 is a block diagram illustrating an embodiment of a security entity object. In the example shown, employee object instance 400 has relation 402 to security entity object instance 404. Employee object instance 400 additionally has relations to other objects, comprising relation 406, relation 408, and relation 410. Employee object instance 400 is a member of an object tree (e.g., the object tree of FIG. 3), through its relations to other object instances, e.g., relation 406, relation 408, and relation 410. When the tree is accessed by an application to store data for report creation, relation 402 to security entity object instance 404 is stored along with attributes and other relations. The stored relation describes which report users (e.g., users such as report user 100 of FIG. 1) can access data regarding employee 400. Each report user has an associated security entity describing his level of access. If security entity object instance 404 is included in the list of security entity object instances which the report user is allowed to access, specified by his associated security entity, then the report user is allowed to access data associated with employee object instance 400.

Security entity object instance 404 has relation 412 to a parent security entity object instance and relation 414 to a child security entity object instance. In some embodiments, parent and child relations between security entity object instances are used to form a security entity hierarchy. In some embodiments, a list of security entity object instances which a user is allowed to access is created from a single associated security entity object instance by traversing the security entity object tree downwards to include all child and lower generation security entity object instances. The hierarchal nature of an organization may be represented in this way.

In some embodiments, employee object instance 400 comprises two or more relations to two or more different security entity object instances. The different relations can be associated with different subsets of the attributes and relations associated with employee 400, allowing a different security policy to be associated with the different subsets of attributes and relations. For instance, any employee may be able to see the title of a given employee, only employees on the same level of the hierarchy and above may see his current projects, and only his supervisors may see his salary.

Figure 5:
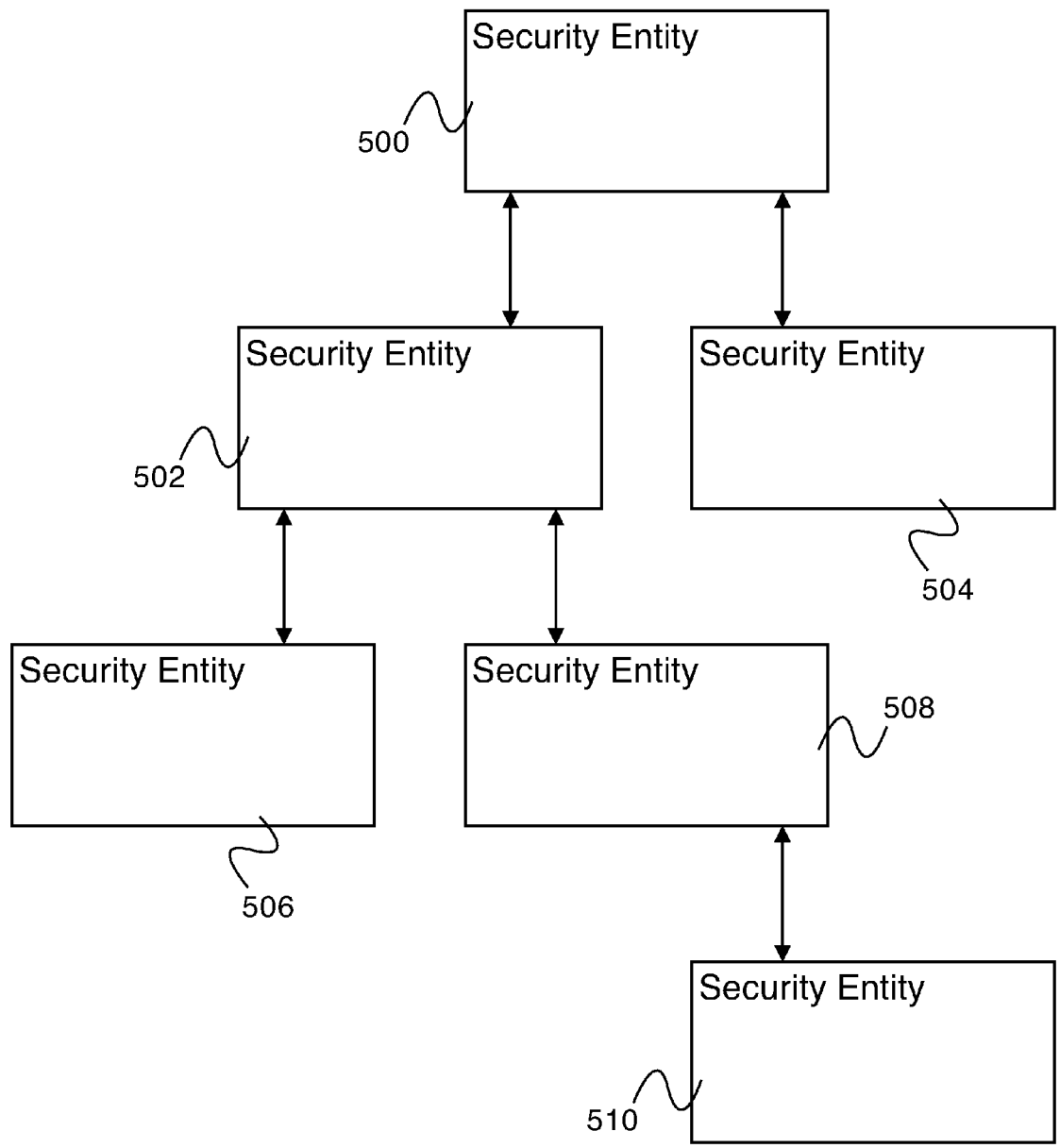
FIG. 5 is a block diagram illustrating an embodiment of a security entity object tree.

FIG. 5 is a block diagram illustrating an embodiment of a security entity object tree. The security entity object tree describes a hierarchy of security entity object instances (e.g., security entity object instance 404 of FIG. 4), through parent security entity and child security entity relations (e.g., parent security entity relation 412 of FIG. 4 and child security entity relation 414 of FIG. 4). In the example shown, security entity object instance 500 has child security entity object instance 502 and security entity object instance 504; security entity object instance 502 has child security entity object instance 506 and security entity object instance 508; and security entity object instance 508 has child security entity object instance 510. In some embodiments, if a report user (e.g., report user 100 of FIG. 1) is associated with a given security entity object instance, he also has access to all objects with associated security entity object instances encountered by traversing the tree downwards from his associated security entity object instance. For instance, if a user is associated with security entity object instance 502, he may access objects associated with security entity object instance 502, security entity object instance 506, security entity object instance 508, and security entity object instance 510. If a user is associated with security entity object instance 504, he may only access objects associated with security entity object instance 504. If a user is associated with security entity object instance 508, he may access objects associated with security entity object instance 508 and security entity object instance 510.

Figure 6:
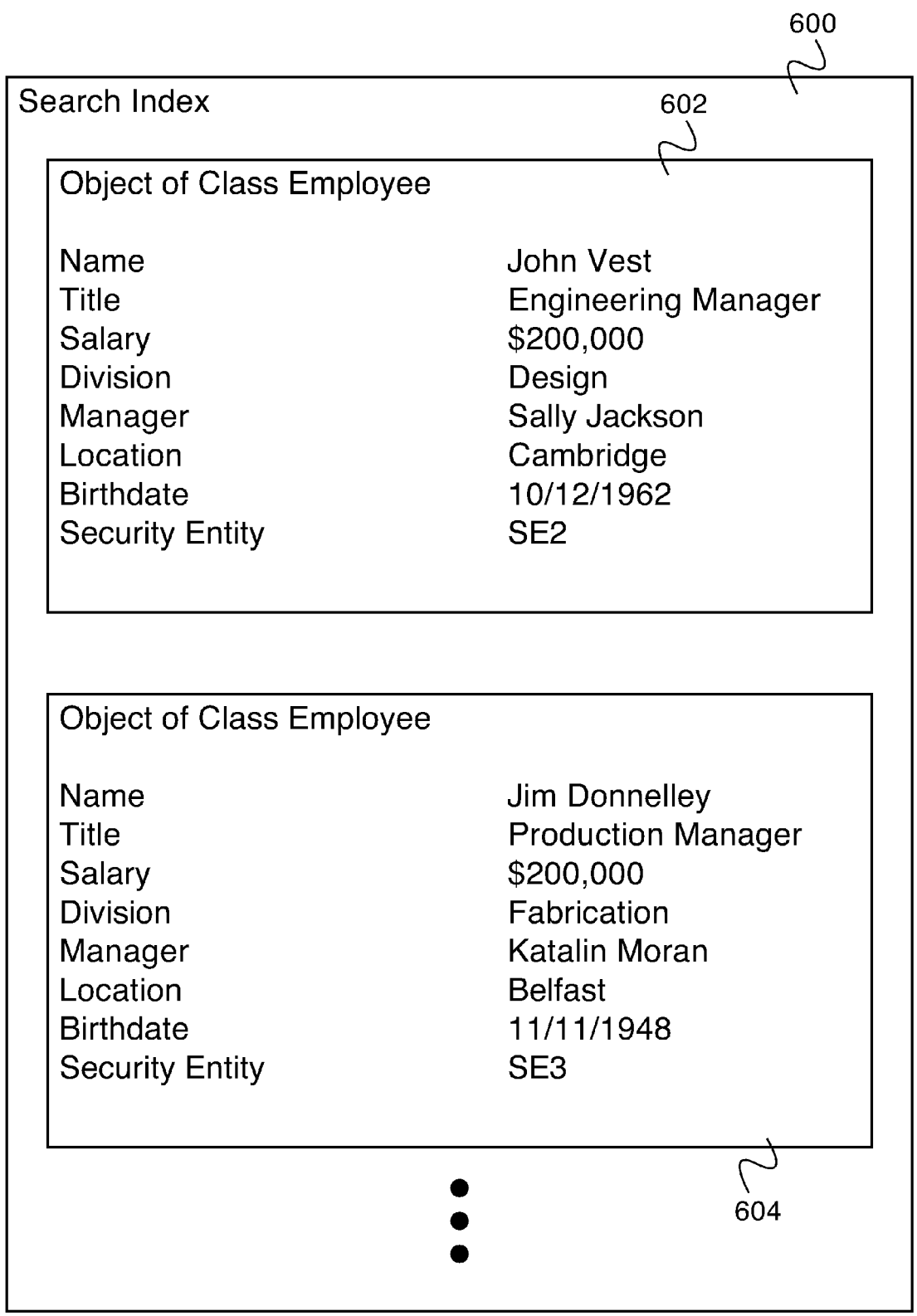
FIG. 6 is a diagram illustrating an embodiment of a search index.

FIG. 6 is a diagram illustrating an embodiment of a search index. In some embodiments, a search index comprises a flattened version of an object tree (e.g., the object tree of FIG. 3). A flattened version of an object tree comprises the data associated with each object instance of the object tree stored in a linear fashion without the hierarchical structure of the object tree, in order to facilitate searching in an efficient fashion. In the example shown, search index 600 comprises object data 602 and object data 604. Each of object data 602 and object data 604 corresponds to an object instance of class employee (e.g., object instance 304 of FIG. 3). Each of object data 602 and object data 604 comprises a list of attribute and relation data associated with the corresponding object instance (e.g., name data, title data, salary data, division data, manager data, location data, birthday data, security entity data, etc.). Additionally, each of object data 602 and object data 604 comprises a reference to the security entity associated with the corresponding object instance. Object data 602 includes a reference to a security entity designated as SE2, and object data 604 includes a reference to a security entity designated as SE3. When a report user (e.g., report user 100 of FIG. 1) executes an application to access stored object data and create a report, the application accesses the list of security entity object instances the report user has access to (e.g., a list of security entity object instances created by traversing a tree of security entity object instances downwards from the security entity object instance associated with the user). If the security entity reference stored with the object data in the search index is found in the list of security entity object instances associated with the report user, the report user is allowed to see the rest of the object data in the search results. For example, a report user may only see data stored in object data 602 as part of a search result if his associated list of security entity object instances includes the object instance designated as SE2. Filtering search results based on associated security entities in this way comprises a role-based security policy for an object-oriented database system.

FIG. 7A is a diagram illustrating an embodiment of a faceted database browsing interface implementing a role-based security policy for an object-oriented database system. In some embodiments, the faceted database browsing system is created by an application accessed by a report user (e.g., report user 100 of FIG. 1). In some embodiments, the faceted database browsing interface utilizes a search index (e.g., search index 600 of FIG. 6). In the example shown, faceted database browsing interface 700 comprises title bar 702, location box 704, division box 706, manager box 708, salary grade box 710, and employee list 712. Title bar 704 shows the object type currently displayed by the browser, as well as any search criteria being applied to the objects. In the example shown, employees are being browsed, and no search criteria have been selected, so all employees are shown. Location box 704 comprises a list of locations various employees work at, as well as the number of employees who work at each location. The data shown in location box 704 is compiled by searching the search index and tallying the location data for each employee. Before the location data of each entry in the search index can be read by the application creating the faceted database browsing interface, the application compares the list of security entity object instances the report user has access to with the security entity object instance associated with the entry. If the security entity object instance associated with the entry is found in the list of security entity object instances the user has access to, the data in the entry is accessed and the location data is added to the tally. After the entire search index has been perused in this way, the final location tally is shown in location box 704. Division box 706 displays a division tally, manager box 708 displays a manager tally, and salary grade box 710 displays a salary grade tally, each created in an analogous way to the location tally shown in location box 704. Each of the data tally boxes (e.g., location box 704, division box 706, manager box 708, and salary grade box 710) additionally serves as a user interface to narrow the currently displayed data set. If a user indicates (e.g., clicks) one of the data tallies shown (e.g., "Cambridge"; "Marketing"; "John Vest"' etc.) the faceted database browsing interface then filters the employees using that data entry as the search criteria. The updated search criteria is shown in title bar 702, updated tallies are shown in location box 704, division box 706, manager box 708, and salary grade box 710, and an updated list of employees is shown in employee list 712. In some embodiments, the boxes 706, 708, 710 etc. each have a different security policy that determines which securing entities a user has access to; this resolution from User->SecuringEntities for any given data field is determined by a customer-configurable security policy.

In some embodiments, a given object has two or more associated security entities, each security entity associated with a different set of attributes and/or relations. When an object has two or more associated security entities, it is possible for a given report user to have access to some data associated with the object but not other data. An object may therefore appear in one of the data tally boxes but not appear in another one of the data tally boxes. In the example shown, the report user accessing the faceted database browsing interface has access to the location, division, and manager of all employees, but only has access to the salary grade of some of the employees.

Employee list 712 comprises a list of the names of all employees meeting the search criteria displayed in title bar 702. In the example shown, all of the names of the employees meeting the search criteria do not fit on the screen, so some have to be accessed through the use of another user interface element (e.g., scrolling, etc.). Only the employees associated with a security entity that the user has access to are shown in the list, if the report user does not have access to the employee data being searched, the application cannot tell if the employee meets the search criteria, and therefore does not display the employee. In some embodiments, if a user indicates (e.g., clicks) one of the employee names displayed in employee list 712, the complete set of employee data for that employee that the user has access to is displayed.

FIG. 7B is a diagram illustrating an embodiment of a faceted database browsing interface implementing a role-based security policy for an object-oriented database system. In the example shown, faceted database browsing interface 720 comprises faceted database browsing interface 700 of FIG. 7A after a report user (e.g., report user 100 of FIG. 1) indicates (e.g., clicks) the data tally labeled "Cambridge" of location tally 704 of FIG. 7A. Title bar 722 displays that the employees displayed has been narrowed to only those in the Cambridge location. Location tally box 724, division tally box 726, manager tally box 728, and salary grade tally box 730 display tallies of different data entries found among the employees in the data set of employees narrowed to only those in the Cambridge location. Employee list 732 displays the names of the eight employees found to work in the Cambridge location.

In various embodiments, the role-based security policy for an object-oriented database system is used as part of a command-line database query tool, a matrix reporting tool, a financial database tool, or any other appropriate database tool. In some embodiments, a matrix reporting tool comprises a two-dimensional matrix of data with each of two fields represented on one of the two axes. The horizontal axis comprises a column for each value of the field represented; correspondingly the vertical axis comprises a row for each value of the field represented. Each cell in the matrix shows a tally of objects found containing both the field value for the column and the field value for the row.

Figure 8:
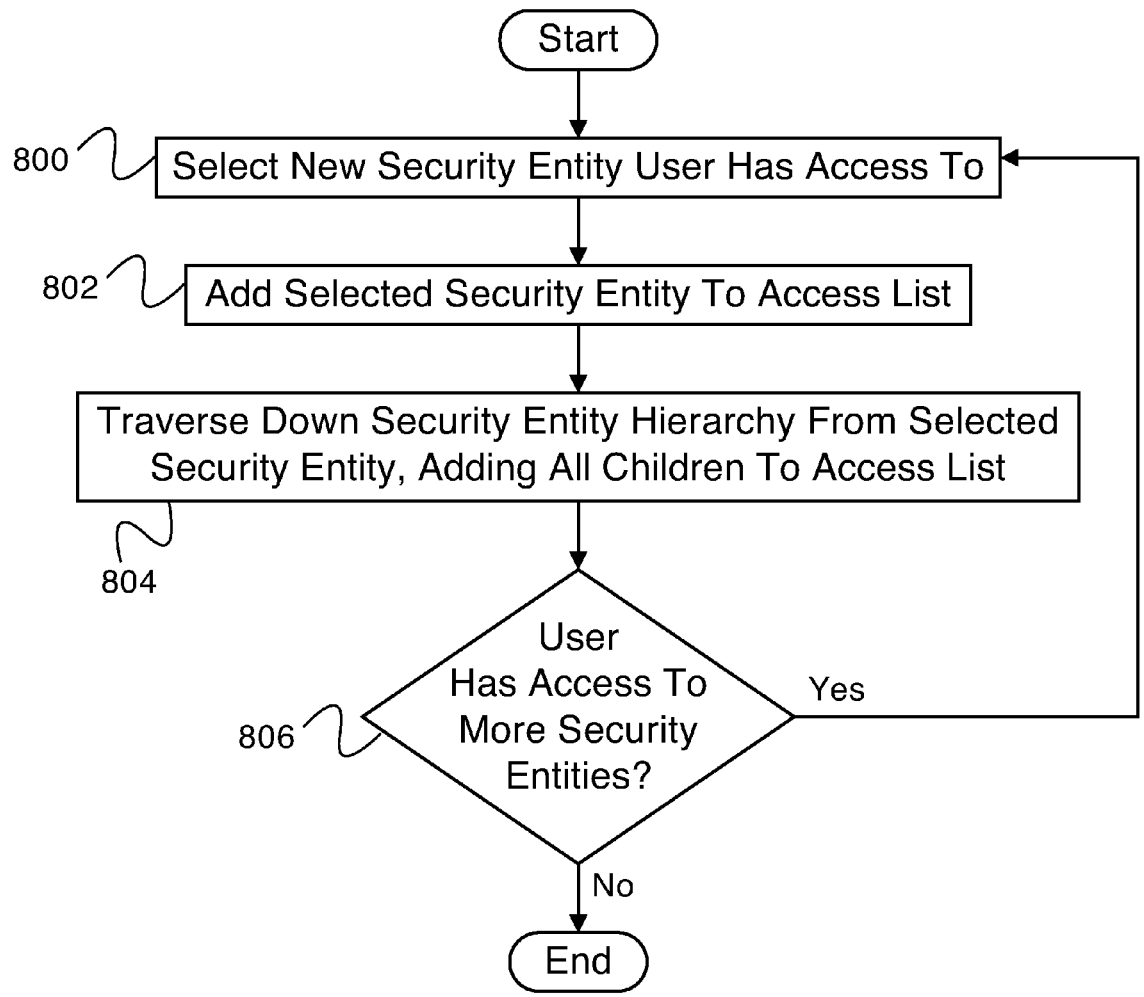
FIG. 8 is a flow diagram illustrating an embodiment of a process for creating a security entity access list.

FIG. 8 is a flow diagram illustrating an embodiment of a process for creating a security entity access list. In some embodiments, the process of FIG. 8 is used by an application executed by a report user (e.g., report user 100 of FIG. 1) as part of the process of executing a database search query. In the example shown, in 800, the process selects a new security entity that the user has access to. In some embodiments, the user has access to only one security entity associated with a given set of attributes and/or relations. In some embodiments, the user has access to a plurality of security entities associated with a given set of attributes and/or relations. In 802, the selected security entity is added to the access list. In 804, the security entity hierarchy (e.g., the security entity hierarchy of FIG. 5) is traversed downwards from the selected security entity and all children are added to the access list. All children of the selected security entity are added to the access list, as are all children of the children of the selected security entity, as are all children of children of children of the selected security entity, etc. In various embodiments, the security entity hierarchy is traversed downwards from the selected in a depth-first fashion, in a breadth-first fashion, randomly, or by any other appropriate tree-traversal method. In 806, it is determined if the user has access to more security entities associated with the same set of attributes and/or relations. If it is determined that the user has access to more security entities in 806, control passes to 800, where the process is repeated for a new security entity. If it is determined that the user does not have access to more security entities in 806, the process ends. If the user has access to more security entities associated with a different set or sets of attributes and/or relations, a different access list is created for each set of attributes and/or relations.

Figure 9A:
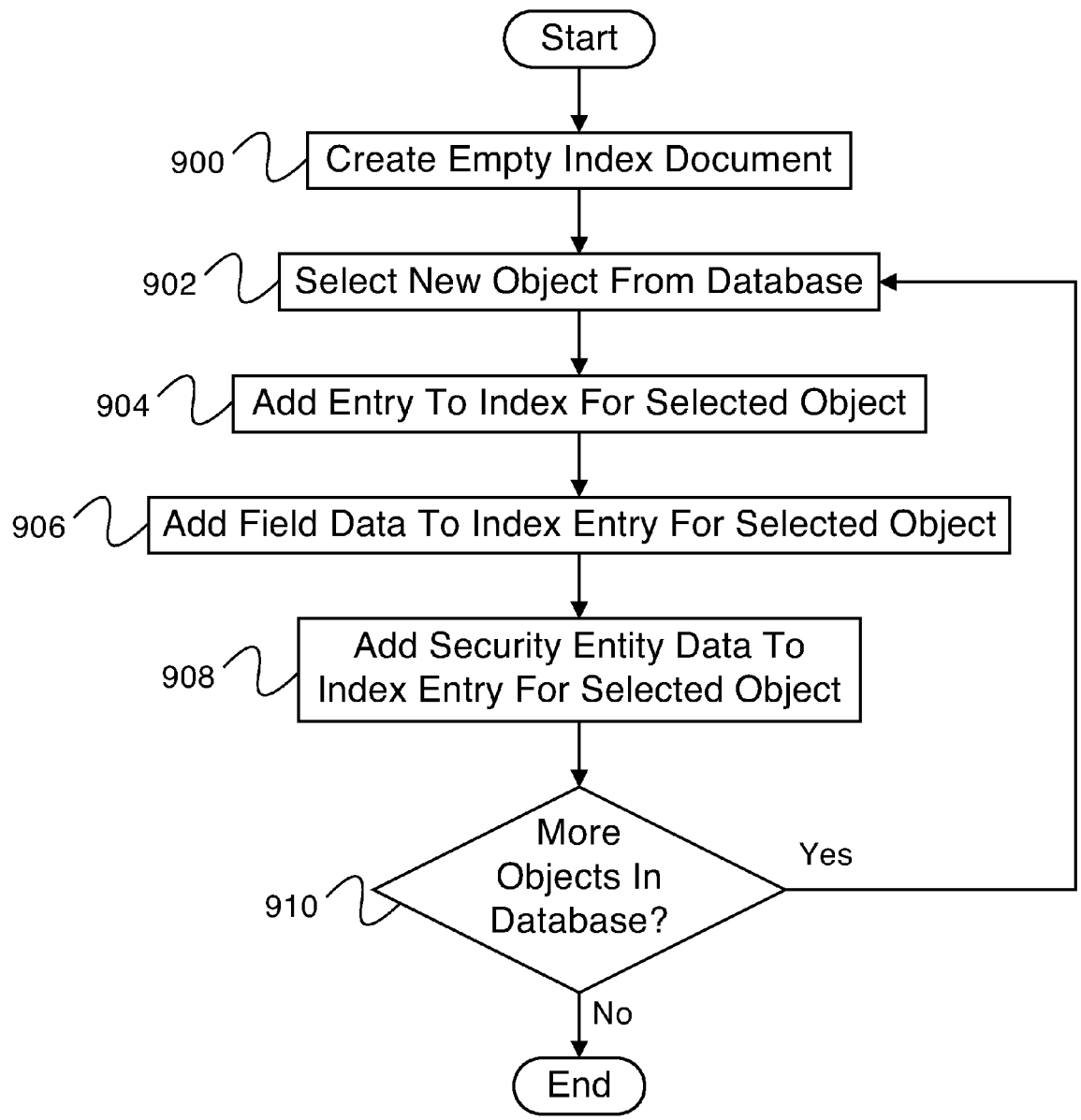
FIG. 9A is a flow diagram illustrating an embodiment of a process for creating a search index implementing a role-based security policy for an object-oriented database system.

FIG. 9A is a flow diagram illustrating an embodiment of a process for creating a search index implementing a role-based security policy for an object-oriented database system. In some embodiments, the process of FIG. 9 is used to create a search index (e.g., search index 600 of FIG. 6) from an object tree (e.g., the object tree of FIG. 3). In the example shown, in 900, an empty index document is created. Data will later be added to the index document. In 902, a new object is selected from the database. In 904, an entry is added to the search index for the selected object. In 906, field data is added to the index entry for the selected object. Field object comprises attribute and relation data. All field data is added to the index entry with no regard for security policy. In 908, security entity data is added to the index entry for the selected object. In some embodiments, one security entity is associated with the object and is added to the search index. In some embodiments, a plurality of security entities are associated with the object, each with a different set of attributes and/or relations, and each is added to the search index. In 910, it is determined if there are more objects in the database that have not yet been added to the index. If it is determined in 910 that there are more objects in the database that have not yet been added to the index, control passes to 902. If it is determined in 910 that there are no more objects in the database that have not yet been added to the index, the process ends.

Figure 9B:
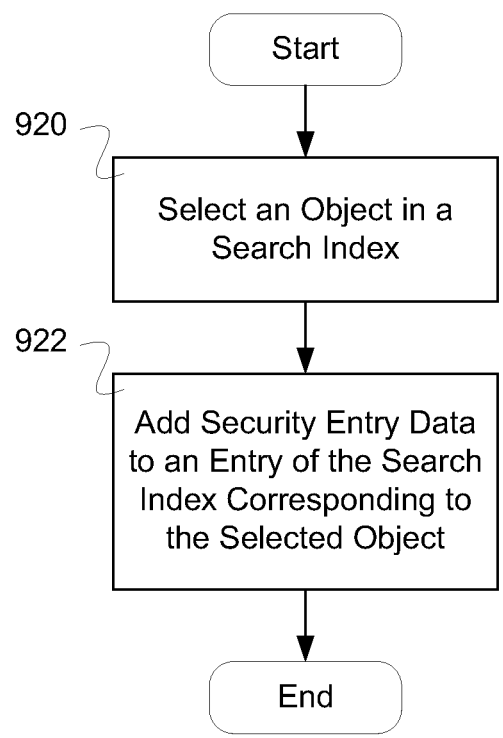
FIG. 9B is a flow diagram illustrating an embodiment of a process for adding security to an index.

FIG. 9B is a flow diagram illustrating an embodiment of a process for adding security to an index. In the example shown, in 920 an object is selected in a search index. The entry associated with the object is stored in the search index. In 922, security entry data is added to an entry of the search index corresponding to the selected object. In some embodiments, the index is constructed with security information added. In some embodiments, security information is added after the index is constructed. In various embodiments, the object is one of a plurality of objects, the entry is one of a plurality of entries, the entry includes a field data associated with the object. The index enables the system to provide search results that are allowed to be accessible to the user requesting the search.

Figure 10:
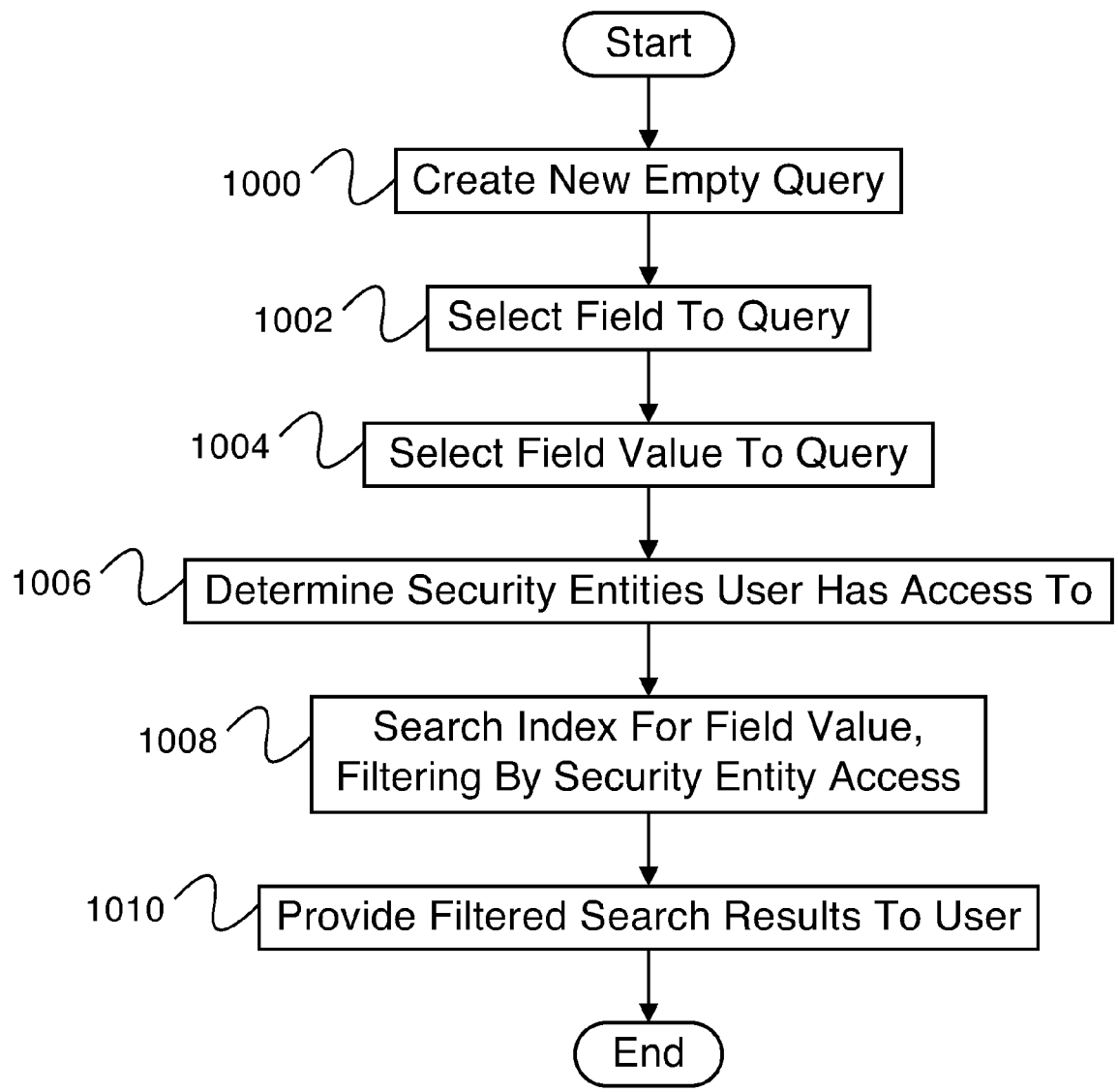
FIG. 10 is a flow diagram illustrating an embodiment of a process for executing a search query implementing a role-based security policy for an object-oriented database system

FIG. 10 is a flow diagram illustrating an embodiment of a process for executing a search query implementing a role-based security policy for an object-oriented database system. In some embodiments, the search query is created by a report user (e.g., report user 100 of FIG. 1) for querying an object-oriented database (e.g., the database represented by the object tree of FIG. 3). In 1000, a new empty query is created. In 1002, the field (e.g., "Location", "Manager", etc.) to query is selected. In 1004, the field value (e.g., "Cambridge", "Marketing", etc.) to query is selected. In some embodiments, the field and field value are selected simultaneously by a report user using a faceted browsing interface. In various embodiments, the field and field value are selected from menus, are typed into a search query interface, are read from a stored file, or are selected by any other appropriate means. In 1006, the security entities that the report user has access to are determined. In some embodiments, the security entities that the user has access to are determined by the process of FIG. 8. In 1008, the search index (e.g., the search index created by the process of FIG. 9) is searched for the field value, filtering by security entity access. Only objects found in the search index where the field value matches the field value being searched and the user (e.g., a report user) has access to the security entity associated with the object are returned by the search. In some embodiments, filtering by security entity access comprises filtering the list of objects to include only those associated with a security entity present in the list of accessible security entities. In 1010, the filtered search results are provided to the user, and the process ends. In some embodiments, each field to query or retrieve has its own securing entities; so, the query contains the accessible securing entities for each field, transmitted in a compressed format since often multiple fields will have the same security policy (and hence the user will have access to the same securing entities for those fields).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for adding security data to a search index, comprising:
    a processor configured to:
        select an object data in a search index that corresponds to an object in an object tree in an object-oriented database, wherein an index entry in the search index comprises the object data that corresponds to the object in the object tree, wherein the index entry comprises field data, wherein field data comprises a list of attributes and relation data associated with the corresponding object in the object tree;
        add security entity data to the index entry corresponding to the selected object data, wherein the security entity data comprises a reference to a security entity object instance in the object tree in the object-oriented database, wherein the security entity object instance is one of more than two security entity object instances in a security entity object tree in the object tree, wherein the security entity object instance comprises a security policy defining security permissions to attributes and relations of the object data, wherein the security entity object instance comprises one or more permissible operations allowed to be performed by a report user on the corresponding object, and wherein the permissible operation includes one of the following: a read operation, a write operation, an edit operation, a delete operation, an access operation, a view operation, or a modify operation;
        determine an access list of security entity object instances that describe the object data the report user is allowed to access, wherein the access list comprises a security entity object instance the report user has a relation with in the security entity object tree and all child security entity object instances when traversing the security entity hierarchy downwards from the security entity object instance that the report user has a relation with and a report user with more access to object data in the search index has an access list with more security entity object instances; and
    a memory coupled to the processor and configured to provide the processor with instructions.

2. A system as in claim 1, wherein the object is one of a plurality of objects in the object tree.

3. A system as in claim 1, wherein the index entry is one of a plurality of index entries.

4. A method for adding security data to a search index, comprising:
    selecting an object data in a search index that corresponds to an object in an object tree in an object-oriented database, wherein an index entry in the search index comprises the object data that corresponds to the object in the object tree, wherein the index entry comprises field data, wherein field data comprises a list of attributes and relation data associated with the corresponding object in the object tree; and
    adding security entity data to the index entry corresponding to the selected object data, wherein the security entity data comprises a reference to a security entity object instance in the object tree in the object-oriented database, wherein the security entity object instance is one of more than two security entity object instances in a security entity object tree in the object tree, wherein the security entity object instance comprises a security policy defining security permissions to attributes and relations of the object data, wherein the security entity object instance comprises one or more permissible operations allowed to be performed by a report user on the corresponding object, and wherein the permissible operation includes one of the following: a read operation, a write operation, an edit operation, a delete operation, an access operation, a view operation, or a modify operation;
    determining an access list of security entity object instances that describe the object data the report user is allowed to access, wherein the access list comprises a security entity object instance the report user has a relation with in the security entity object tree and all child security entity object instances when traversing the security entity hierarchy downwards from a security entity object in the security entity hierarchy that the report user has a relation with and a report user with more access to object data in the search index has an access list with more security entity object instances.

5. A computer program product for adding security data to a search index, the computer program product being embodied in a non-transitory computer readable storage medium and comprising computer instructions for:
selecting an object data in a search index that corresponds to an object in an object tree in an object-oriented database, wherein an index entry in the search index comprises the object data that corresponds to the object in the object tree, wherein the index entry comprises field data, wherein the field data comprises a list of attributes and relation data associated with the corresponding object in the object tree; and
adding security entity data to the index entry corresponding to the selected object data, wherein the security entity data comprises a reference to a security entity object instance in the object tree in an object-oriented database, wherein the security entity object instance is one of more than two security entity object instances in a security entity object tree in the object tree, wherein the security entity object instance comprises a security policy defining security permissions to attributes and relations of the object data, wherein the security entity object instance comprises one or more permissible operations allowed to be performed by a report user on the corresponding object, and wherein the permissible operation includes one of the following: a read operation, a write operation, an edit operation, a delete operation, an access operation, a view operation, or a modify operation;
determining an access list of security entity object instances that describe the object data the report user is allowed to access, wherein the access list comprises a security entity object instance the report user has a relation with in the security entity object tree and all child security entity object instances when traversing the security entity hierarchy downwards from a security entity object in the security entity hierarchy that the report user has a relation with and a report user with more access to object data in the search index has an access list with more security entity object instances.

6. A system for querying a search index, comprising:
a processor configured to:
receive a query from a report user, wherein the report user is associated with a security entity object instance in an object-oriented database, wherein the security entity object instance is one of more than two security entity object instances in a security entity object tree in the object tree;
determine an access list of security entity object instances that describe object data the report user is allowed to access, wherein the access list comprises the security entity object instance the report user has a relation with and all child security entity instances when traversing the security entity hierarchy downwards from the security entity object that the report user is associated with, and a report user with more access to object data has an access list with more security entity object instances;
search a search index for object data that corresponds to objects in an object tree in the object-oriented database to generate a list of objects with a matching field value to a field value to the query from the report user, wherein the search index comprises a plurality of index entries of object data, wherein each of the index entries comprises field data, wherein the field data comprises a list of attributes and relation data associated with the corresponding object in the object tree, wherein the index entries further comprises a security entity data, wherein the security entity data comprises a reference to a security entity object instance associated with the corresponding object in the object tree, wherein the security entity object instance comprises a security policy defining security permissions to attributes and relations of the object data, wherein the security entity object instance comprises one or more permissible operations allowed to be performed by the report user on the corresponding object, wherein the permissible operation includes one of the following: a read operation, a write operation, an edit operation, a delete operation, an access operation, a view operation, or a modify operation;
filter the list of objects to include only those objects associated with a security entity object instance present in the access list of security entity object instances; and
a memory coupled to the processor and configured to provide the processor with instructions.

7. A system as in claim 6, wherein the search index for objects includes the security entity data associated with the field value of the field data of an object.

8. A system as in claim 6, wherein the query comprises a field to query.

9. A system as in claim 8, wherein the query comprises a field value to query of the field.

10. A method for querying a search index, comprising:
receiving a query from a report user, wherein the report user is associated with a security entity object instance in an object-oriented database, wherein the security entity object instance is one of more than two security entity object instances in a security entity object tree in the object tree;
determining an access list of security entity object instances that describe object data the report user is allowed to access, wherein the access list of comprises the security entity object instance the report user has a relation with and all child security entity instances when traversing the security entity hierarchy downwards from the security entity object that the report user has a relation with, and a report user with more access to object data has an access list with more security entity object instances;
searching a search index for object data that corresponds to objects in an object tree in the object-oriented database to generate a list of objects with a matching field value to a field value to the query from the report user, wherein the search index comprises a plurality of index entries of object data, wherein each of the index entries comprises field data, wherein the field data comprises a list of attributes and relation data associated with the corresponding object in the object tree, wherein the index entries further comprises a security entity data, wherein the security entity data comprises a reference to a security entity object instance associated with the corresponding object in the object tree, wherein the security entity object instance comprises a security policy defining security permissions to attributes and relations of the object data, wherein the security entity object instance comprises one or more permissible operations allowed to be performed by the report user on the corresponding object, wherein the permissible operation includes one of the following: a read operation, a write operation, an edit operation, a delete operation, an access operation, a view operation, or a modify operation; and filtering the list of objects to include only those objects associated with a security entity object instance present in the access list of security entity object instances.

11. A computer program product for querying a search index, the computer program product being embodied in a non-transitory computer readable storage medium and comprising computer instructions for:

receiving a query from a report user, wherein the report user is associated with a security entity object instance in an object-oriented database, wherein the security entity object instance is one of more than two security entity object instances in a security entity object tree in the object tree;

determining an access list of security entity object instances that describe object data the report user is allowed to access, wherein the access list of comprises the security entity object instance the report user has a relation with and all child security entity instances when traversing the security entity hierarchy downwards from the security entity object that the report user has a relation with, and a report user with more access to object data has an access list with more security entity object instances;

searching a search index for object data that corresponds to objects in an object tree in the object-oriented database to generate a list of objects with a matching field value to a field value to the query from the report user, wherein the search index comprises a plurality of index entries of object data, wherein each of the index entries comprises field data, wherein the field data comprises a list of attributes and relation data associated with the corresponding object in the object tree, wherein the index entries further comprises a security entity data, wherein the security entity data comprises a reference to a security entity object instance associated with the corresponding object in the object tree, wherein the security entity object instance comprises a security policy defining security permissions to attributes and relations of the object data, wherein the security entity object instance comprises one or more permissible operations allowed to be performed by the report user on the corresponding object, wherein the permissible operation includes one of the following: a read operation, a write operation, an edit operation, a delete operation, an access operation, a view operation, or a modify operation; and filtering the list of objects to include only those objects associated with a security entity object instance present in the access list of security entity object instances.

12. A system as in claim 1, wherein security entity data corresponding to one object is different from security entity data corresponding to another object.

13. A system as in claim 1, wherein the access list comprises two or more security entity object instances.

\* \* \* \* \*

UNITED STATES PATENT AND TRADEMARK OFFICE
CERTIFICATE OF CORRECTION

PATENT NO. : 9,002,803 B2
APPLICATION NO. : 13/154714
DATED : April 7, 2015
INVENTOR(S) : Qayyum et al.

Page 1 of 1

It is certified that error appears in the above-identified patent and that said Letters Patent is hereby corrected as shown below:

In the claims

In Column 12, Claim 10, Line 40, after "access list", delete "of".

In Column 13, Claim 11, Line 18, after "access list", delete "of".

Signed and Sealed this
Fifth Day of July, 2016

Michelle K. Lee
*Director of the United States Patent and Trademark Office*